US 8,104,021 B2

(12) United States Patent
Erlingsson et al.

(10) Patent No.: US 8,104,021 B2
(45) Date of Patent: Jan. 24, 2012

(54) VERIFIABLE INTEGRITY GUARANTEES FOR MACHINE CODE PROGRAMS

(75) Inventors: Ulfar Erlingsson, San Francisco, CA (US); Martin Abadi, Palo Alto, CA (US); Michael Vrable, San Diego, CA (US)

(73) Assignee: Microsoft Corporation, Redmond, WA (US)

( * ) Notice: Subject to any disclaimer, the term of this patent is extended or adjusted under 35 U.S.C. 154(b) by 1382 days.

(21) Appl. No.: 11/450,493

(22) Filed: Jun. 9, 2006

(65) Prior Publication Data

US 2007/0285271 A1    Dec. 13, 2007

(51) Int. Cl.
*G06F 9/45* (2006.01)
(52) U.S. Cl. ........................................ 717/126
(58) Field of Classification Search .................. 717/126
See application file for complete search history.

(56) References Cited

U.S. PATENT DOCUMENTS

| | | | | |
|---|---|---|---|---|
| 5,761,477 | A | 6/1998 | Wahbe et al. | 395/406 |
| 6,151,618 | A | 11/2000 | Wahbe et al. | 709/1 |
| 7,454,324 | B1 * | 11/2008 | Seawright et al. | 703/14 |
| 2002/0078119 | A1 * | 6/2002 | Brenner et al. | 709/102 |
| 2007/0094431 | A1 * | 4/2007 | Fachan | 710/200 |
| 2007/0094669 | A1 * | 4/2007 | Rector et al. | 718/104 |

OTHER PUBLICATIONS

Abadi, M. et al, "Control-Flow Integrity: Principles, Implementations and Applications", University of California, Santa Cruz, Microsoft Research, Silicon Valley, Princeton University, Oct. 26, 2004, 24 pages.

Avijit, K. et al., "TIED, LibsafePlus: Tools for Runtime Buffer Overflow Protection", *Proceedings of the 13th USENIX Security Symposium*, Aug. 9-13, 2004, San Diego, CA, USA, 12 pages.

Baratloo, A. et al., "Transparent Run-Time Defense Against Stack Smashing Attacks", *Proceedings of the 2000 USENIX Annual Technical Conference*, Jun. 18-23, 2000, San Diego, California, 13 pages.

Bhatkar, S. et al., "Address Obfuscation: An Efficient Approach to Combat a Broad Range of Memory Error Exploits", *Proceedings of the 12th USENIX Security Symposium*, Aug 4-8, 2003, 105-120.

Brumley, D. et al., "Remote Timing Attacks are Practical", *Proceedings of the 12th USENIX Security Symposium*, Aug. 4-8 2003, 1-13.

Chew, M. et al., "Mitigating Buffer Overflows by Operating System Randomization", Fall 1999 @UC Berkeley, 1-9.

Cowan, C. et al., "Point Guard™: Protecting Pointers from Buffer Overflow Vulnerabilities", *Proceedings of the 12th USENIX Security Symposium*, Aug. 4-8, 2003, 91-104.

(Continued)

*Primary Examiner* — John Chavis
(74) *Attorney, Agent, or Firm* — Woodcock Washburn LLP (57) ABSTRACT

A verifier performs static checks of machine code to ensure that the code will execute safely. After verification is performed, the code is executed. The code modules generated by the rewriter and verified by the verifier prevent runtime code modifications so that properties established by the verifier cannot be invalidated during execution. Guards ensure that control flows only as expected. Stack data that must be shared within a code module, and which may therefore be corrupted during execution, is placed on a separate data stack. Other stack data remains on the regular execution stack, called the control stack. Multiple memory accesses can be checked by a single memory-range guard, optimized for fast access to the most-frequently used memory.

20 Claims, 7 Drawing Sheets

OTHER PUBLICATIONS

Cowan, C. et al., "FormatGuard: Automatic Protection from printf Format String Vulnerabilities", *Proceedings of the 10th USENIX Security Symposium*, Aug. 13-17, 2001, 10 pages.

Kiriansky, V. et al., "Secure Execution Via Program Shepherding", *Proceedings of the 11th USENIX Security Symposium*, Aug. 5-9, 2002, San Francisco, CA., 17 pages.

Kiriansky, V.L., "Secure Execution Environment via Program Shepherding", *Submitted to the Department of Electrical Engineering and Computer Science*, Feb. 4, 2003, 1-82.

Kirovski, D. et al., "Enabling Trusted Software Integrity", *ASPLOS*, 2002, 1-13.

Larson, E. et al., "High Coverage Detection of Input-Related Security Faults", *Proceedings of the 12th USENIX Security Symposium*, Aug. 4-8, 2003, Washington, D.C., 121-136.

McCamant, S. "Verifiable Binary Sandboxing for a CISC Architecture", May 14, 2004, 14 pages.

Nebenzahl, D. et al., "Install-time Vaccination of Windows Executables to Defent Against Stack Smashing Attacks", *Technical Report EES2003-9, School of Electrical Engineering*, Nov. 4, 2003, 17 pages.

Oplinger, J. et al., "Enhancing Software Reliability with Speculative Threads", *ACM*, 2002, 13 pages.

Pincus, J. et al., "Mitigations for Low-Level Coding Vulnerabilities: Incomparability and Limitations", *Microsoft Research*, Jan. 29, 2004, 1-12.

Pincus, J. et al., "Beyond Stack Smashing: Recent Advances in Exploiting Buffer Overruns", *IEEE Computer Society*, 2004, 20-27.

Provos, N. et al., "Preventing Privilege Escalation", *Proceedings of the 12th USENIX Security Symposium*, Aug. 4-8, 2003, 231-241.

Richarte, G. et al, "Four Different Tricks to Bypass StackShield and StackGuard Protection", *Core Security Technologies*, Apr. 9, 2002-Apr. 24, 2002, 1 thru 26.

Shacham, H. et al., "On the Effectiveness of Address Space Randomization", May 12, 2004, 17 pages.

Tabatabai, A.R.A., et al., "Efficient and Language-Independent Mobile Programs", *Proceedings of PLDI, ACM SIGPLAN Conference on Programming Languate Design and Implementation*, 1996, 10 pages.

Tuck, N. et al., "Hardware and Binary Modification Support for Code Pointer Protection from Buffer Overflow", *Proceedings of the 37th International Symposium on Microarchitecture*, Dec. 2004, 12 pages.

Wagner, D. et al., "Mimicry Attacks on Host-Based Intrusion Detection Systems", *CCS*, 2002, 10 pages.

Wahbe, R. et al., "Efficient Software-Based Fault Isolation", *Proceedings of the Symposium on Operation System Principles*, 1993, 14 pages.

Wilander, J. et al., "A Comparison of Publicly Available Tools for Dynamic Buffer Overflow Prevention", *10th Network and Distributed System Security Symposium*, 2003, 14 pages.

Oh, N. et al., "Control-Flow Checking by Software Signatures", *IEEE Transactions on Reliability*, Mar. 2002, 51(2), 111-122.

Reis, G.A. et al., "SWIFT: Software Implemented Fault Tolerance", http://liberty.princeton.edu/Publications/, Mar. 2005, 12 pages.

Venkatasubramanian, R. et al., "Low-Cost On-Line Fault Detection Using Control Flow Assertions", *Proceedings of the 9th IEEE International On-Line Testing Symposium*, 2003, 7 pages.

De Sutter, B. et al., "Link-Time Binary Rewriting Techniques for Program Compaction", *ACM Transactions on Programming Languages and Systems*, Sep. 2005, 27(5), 882-945.

Necula, G.C. et al., "Safe Kernel Extension Without Run-Time Checking", *Proceedings of the Second Symposium on Operating Systems Design and Implementation*, 1996, 229-243.

Necula, G.C., "Proof-Carrying Code", *Proceedings of the 24th Annual ACM SIGPLAN-SIGACT Symposium on Principles of Programming Languages*, 1997, 14 pages.

Ruwase et al., "A Practical Dynamic Buffer Overflow Detector", Proceedings of the 11th Annual Network and Distributed System Security Symposium, Feb. 5-6, 2004, 11 pages.

Suh et al., "Secure Program Execution via Dynamic Information Flow Tracking", Proceedings of the 11th international conference on Architectural support for programming languages and operating systems, Oct. 2004, 14 pages.

Vachharajani et al., "RIFLE: An Architectural Framework for User-Centric Information-Flow Security", 37th International Symposium on Microarchitecture, Dec. 4-8, 2004, 243-254.

Wagner et al., "Intrusion Detection via Static Analysis", IEEE Symposium on Security and Privacy, Oakland, CA , USA, May 14-16, 2001, 156-168.

Wagner et al., "A First Step Towards Automated Detection of Buffer Overrun Vulnerabilities", In Network and Distributed System Security Symposium, Feb. 2000, 3-17.

Xu et al., "Transparent Runtime Randomization for Security", 22nd International Symposium on Reliable Distributed Systems, Oct. 6-18, 2003, 260-269.

\* cited by examiner

155
Start; identify references to shared state

↓

160
Statically verify operations associated with shared state (*e.g.*, assignments to shared state) will be executed properly

↓

165
Statically verify that guards will execute properly to ensure other operations associated with shared state will be executed properly ; end

FIG. 2

| Code | Verification state |
|---|---|
| | {origCSP=CSP+8, valid(CSP, CSP+8)} |
| | {retaddr=Mem[CSP+4] } |
| | {origDSP=Mem[CSP], valid(DSP-32, DSP)} |
| 0. memguard(addr:=EAX, lo:=0, hi:=8) | |
| | {valid(EAX-0, EAX+8)} |
| 1. EDX := Mem[EAX] | |
| 2. Mem[EAX + 4] := EDX | |
| 3. EAX := Mem[DSP - 4] | |
| 4. pop DSP  # DSP := Mem[CSP]; CSP := CSP+4 | |
| | {origDSP=DSP, valid(CSP, CSP + 4)} |
| | {origCSP=CSP+4, retaddr=Mem[CSP]} |
| 6. ret       # CSP := CSP+4;  jump Mem[CSP-4] | |

```
int f() {
    int x, y;
    y = g(1, 2);
}
int g(int a, int b) {
    int z;
    h(&z);
    return a + b*z;
}
void h(int *z) {
    *z = 2;
}
```

| 303 | return address | X | Y | 2 | 1 | return address | Z | &Z | return address |
|---|---|---|---|---|---|---|---|---|---|

FIG. 5B

| 310 | | X | Y | 2 | 1 | | Z | &Z | |
|---|---|---|---|---|---|---|---|---|---|

| 320 | return address | return address | return address | |
|---|---|---|---|---|

```
# memguard (addr:=EAX, lo:=L, hi:=H) =
    if A+L ≤ EAX < B - H, goto M
    push EAX              # Arguments for
    push L, H             # slower guard
    call SlowpathWriteGuard
M:  Mem[EAX] := 42        # The write
```

```
    if EAX < A + L, goto S
    if B - H ≤ EAX, goto S
M:  Mem[EAX[ := 42         # The write
...
S:  push EAX               # Arguments for
    push L, H              # slower guard
    call SlowpathWriteGuard
    jump M                 # Allow write
```

VERIFIABLE INTEGRITY GUARANTEES FOR MACHINE CODE PROGRAMS

CROSS-REFERENCE TO RELATED APPLICATIONS

The subject matter of this application is related to that of U.S. patent application Ser. No. 11/036,121, titled "Software Security Based On Control Flow Integrity" and of U.S. patent application Ser. No. 11/036,801, titled "Software Memory Access Control," both of which were filed on Jan. 14, 2005. Each of the above-referenced patent applications is incorporated by reference in its entirety.

BACKGROUND

A computer system's reference monitor may look at memory accesses made by a program to ensure that the accesses are acceptable. Before use of the reference monitor, computers may have had difficulty because one program could attempt to access another program's memory. Such accesses could be insidious, causing programs to misbehave while creating difficulties in diagnosing problems. Thus reference monitors were inserted into hardware systems to observe accesses to memory. The reference monitor may generate an exception if a program attempts to improperly access memory.

A problem that may be associated with reference monitors is that they may not be able to prevent insidious memory accesses by one portion of a program vis a vis another portion of the same program. That is, computer systems may not use the reference monitors at the lowest levels such as at the operating system's kernel level. Rather, system operations may be separated into programs, and the operating system may switch between them, with each being subject to the reference monitor in a particular way. Therefore, a program may be unable to protect different components or subprograms of itself from each other. Similarly, the operating system kernel may be unable to protect itself from its components unless it forces those components to run as programs.

While software-based solutions to problems associated with the reference monitor have been implemented, many of these solutions are not practical. Specifically, the solutions fail to address practical requirements or characteristics of software. For example, software typically is multi-threaded. Also, the system may have to increase and decrease the amount of memory allocated to the software during execution. Software execution is sometimes interrupted. Finally, software needs to handle exceptions or normal transitions in control flow. The solutions offered to combat problems associated with the reference monitor may not account for these practical requirements or characteristics of software.

SUMMARY

A verification is performed to identify, in a machine code module—that is, in a module having instructions that are directly interpreted by computer hardware—that operations associated with shared state are proper. The verification may be a static verification to ensure, for example, that values assigned to references to the shared state are proper. The verification may also look at "guards" within the code modules to ensure that the guards will perform checks at execution to ensure proper assignment of values, proper control flow integrity, etc.

A verifier performs static checks of machine code to ensure that the code will execute safely. A stand-alone code rewriter or a rewriter in conjunction with a compiler can be used to rewrite code, including legacy code, so that the code will pass the checks performed by the verifier. After verification is performed, the code is executed. The verifier may perform static checks that include the verification that code for proper dynamic checks (or inline "guards") are present in the code. These dynamic checks may be executed at runtime to ensure continued safe execution.

The protection offered by the verifier can benefit any host systems, such as operating systems and web browsers, that load binary modules into their address space to make use of their functionality. The code modules generated by the rewriter and verified by the verifier may prevent runtime code modifications so that properties established by the verifier cannot be invalidated during execution. Guards ensure that control flows only as expected, even on computed transfers, and that memory is accessed only as expected. Additionally, stack data that must be shared within a code module, and which may therefore be corrupted during execution, is placed on a separate data stack. Other stack data, including function-return addresses, remain on the regular execution stack, called the control stack. The control stack is not accessed via computed memory references such as pointers and therefore can be used to provide incorruptible thread-local storage. Moreover, multiple memory accesses can be checked by a single memory-range guard, optimized for fast access to the most-frequently used memory. Memory-guard ranges are implemented as two paths, one faster and the other slower.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Figure 1:
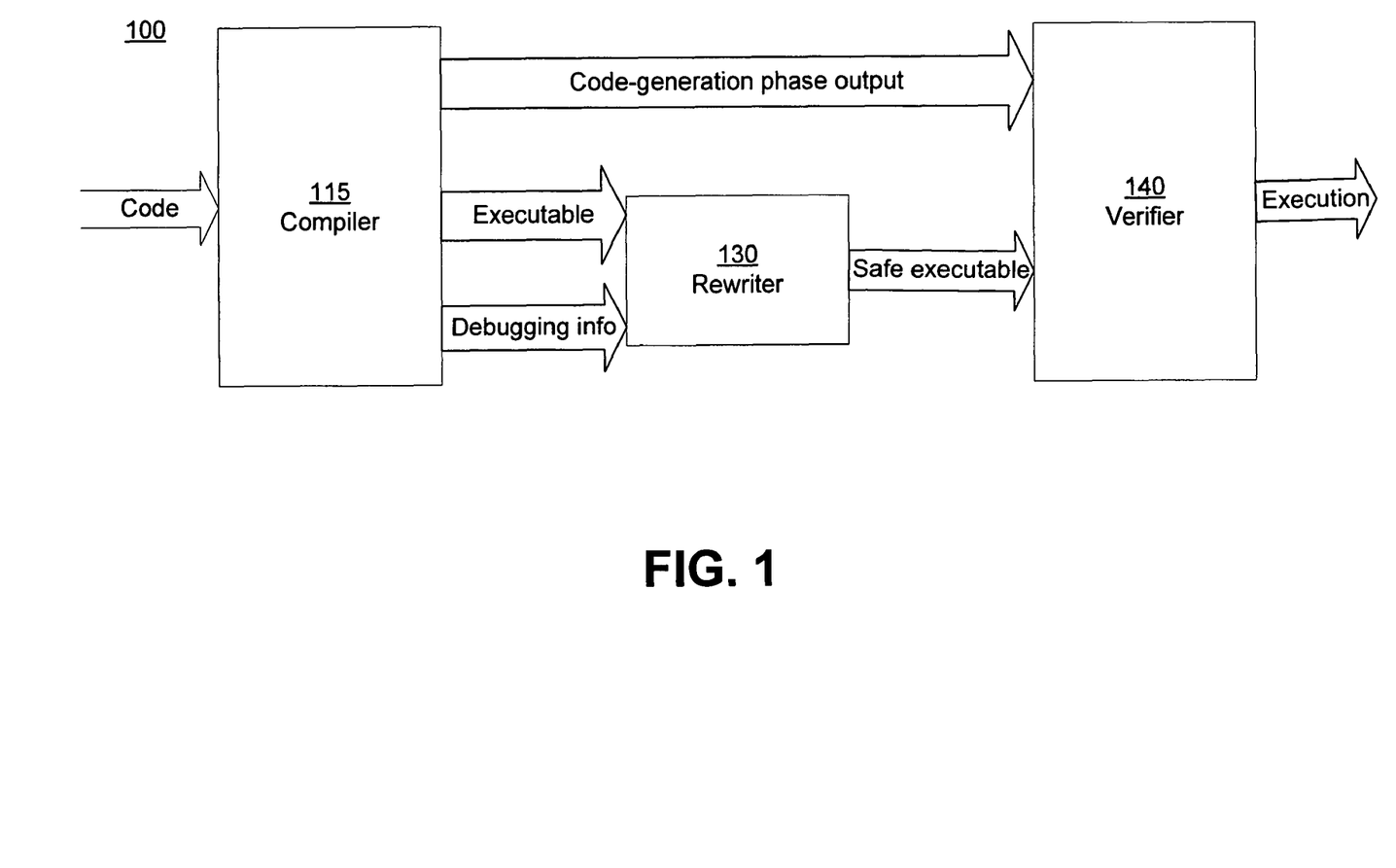
FIG. 1 is a block diagram of a system for implementing verifiable integrity guarantees for machine code programs.

FIG. 1 is a block diagram of a system 100 for implementing verifiable integrity guarantees for machine code programs. The system 100 may be appropriate for any x86 architecture or for other processing systems. The system 100 may include a compiler 115, a rewriter 130, and a verifier 140. After the compiler compiles a machine code program, the rewriter 130 may receive executable code along with debugging information. The rewriter 130 (or, alternatively, the compiler 115) may impose an appropriate structure on the code so that the code may be approved by the verifier 140. The rewriter 130 may structure the code whether the code is written in a high level language, such as C, C++, or Java, or is a handwritten assembly code. The rewriter may be based on, for example, "Vulcan" as described in A. Srivastava, A. Edwards, and H. Vo, *Binary Transformation in a Distributed Environment*, Technical Report MSR-TR-2001-50, Microsoft Research (2001), which is incorporated herein by reference in its entirety. Such a rewriter may, for example, convert Microsoft Windows x86 executables into modules that can be approved by the verifier 140. In alternative embodiments, a system for implementing verifiable integrity guarantees for machine code programs may include rewriting executable code manually (e.g., by "hand"), even if no debugging information is present.

The rewriter 130 may complete static analysis, e.g., of control flow, stack use, and registers, and analysis may not be linear. In alternative embodiments, analysis may be simplified and more precise if the code modules to be evaluated by the verifier 140 were output by a code-generation phase of the compiler 115. Such compiler support, while not required, could make more thorough use of mechanisms described herein, help reduce overhead, and remove some limitations that may be present without such compiler support.

After processing and structuring code, a safe executable code module may be sent to the verifier 140. Thus the code module may be an executable binary that is structured to satisfy verification. The verifier 140 may perform static analysis of code modules to ensure, for example, that all execution paths contain correct guards before any possible protection violation. In this way, software that hosts such modules need trust only the verifier 140. In particular, static verification may establish restrictions on control flow, including computed control flow transfers such as calls via function pointers. The analysis may be facilitated by guards that may constrain control flow at runtime. Though they do not include logical proofs, the code modules may be viewed as examples of Proof-Carrying Code (PCC), as described in G. Necula, *Proof-Carrying Code*, Proceedings of the 24$^{th}$ ACM Symposium on Principles of Programming languages, pp. 106-119 (January 1997), which is incorporated herein by reference in its entirety. Protections, as described herein, may be implemented to help prevent runtime code modifications so that any properties established or verified by the verifier cannot be invalidated during code execution.

The verifier 140 may be relatively fast in that it may run as a simple, linear pass over the bytes of the code module from the rewriter 130 or, in alternative embodiments, the compiler 115. The verifier 140 may perform comparisons and parse-table lookups. That is, the verifier 140 may include a simple object-file parser and instruction decoder. The verifier 140 may do local reasoning about individual basic code blocks and may rely on hints about global analysis results that are placed into the object file, e.g., by the rewriter. These untrusted hints may enable elaborate verification with a simple linear-scan verifier 140. A similar strategy may be used by Java and CLR byte-code verifiers, or proof-carrying code systems.

As explained, the verifier 140 may check that other safety mechanisms are used correctly, by enforcing constraints. One constraint may be that the program use only certain machine instructions, for which the verifier 140 is able to enforce safety. Another constraint may be that memory access instructions are preceeded by appropriate runtime memory-range guards. A third constraint may be that control transfer instructions either have known targets in a code segment, or are indirect and are preceeded by a correct control-flow-instruction guard. Such guards are described in U.S. patent application Ser. No. 11/036,121 titled, "Software Security Based On Control Flow Integrity." Another constraint may be that the data stack and the control stack, as described here, are managed properly. For example, data and control stack pointers may be updated only by constant amounts, the code may contain stack overflow guards, the return address and other virtual registers are saved and retrieved from the control stack only, and the heights of both stacks are preserved across function calls.

Figure 2:
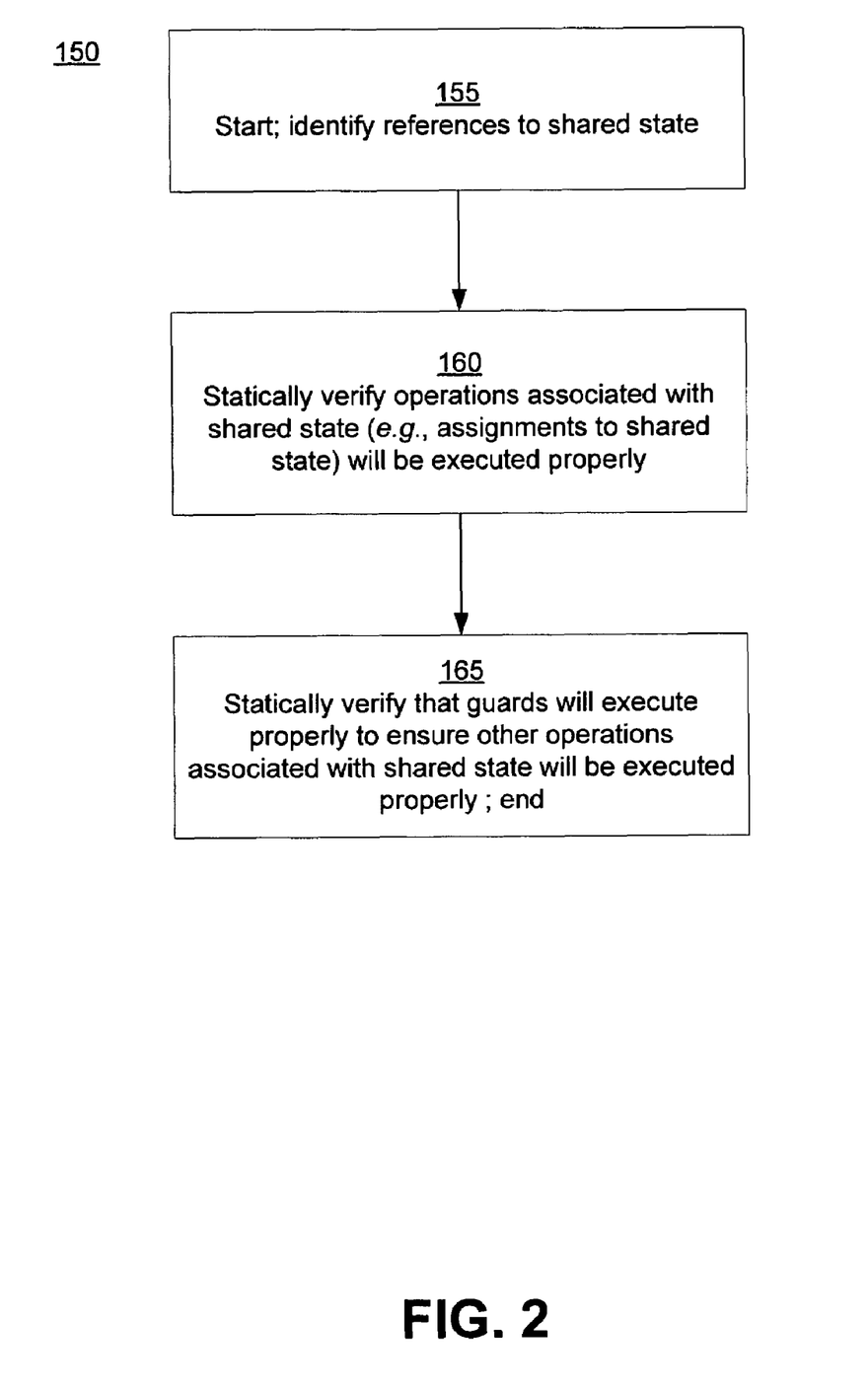
FIG. 2 is a flow diagram of an example method for implementing verifiable integrity guarantees for machine code programs.

FIG. 2 is a flow diagram of an example method 150 for implementing verifiable integrity guarantees for machine code programs. The method 150 may include, in a broad sense, two components or steps. First, a verification of a code module may be completed to ensure that operations associated with shared state will be executed properly. This verification may assure, for example, that values known at the time of the verification are proper and will be properly assigned. Second, a verification may be completed to ensure that, during execution of the code module, guards will ensure that operations associated with the shared state will be executed properly. Such guards may ensure, for example, that control flow will proceed properly, such control flow being unknown at the time of the verifications performed according to the method 150.

The "operations" that may be verified through the method 150 may be any operations that involve state, that is, memory, that is shared between the machine-code module being verified and any other code module. Such a shared state may be, for example, a hardware register. The hardware register may be, for example, an instruction pointer, a stack pointer, a flags register, a processor control register, or an implicitly referenced register. Such a shared state may be include a control stack, a thread control memory, a process control memory, and control memory for handling of exceptions or signals.

The method 150 may be performed at the creation of a code module or may be performed by an end-user of the code module. Additionally, the method 150 may be performed at any point during distribution of the code module, such as, for example, by a retail store preparing to sell the code module to a customer. As described herein, the method 150 may be performed "by hand" (e.g., by a person reading the applicable program code). Alternatively, the method 150 may be performed by a verifier such as the verifier 140, or by a rewriter such as the rewriter 130. In other alternative embodiments, the method 150 may be performed by a compiler such as the compiler 115 or by a run-time code generator.

The method 150 may start at step 155 with identification of references to shared state within a code module. The code module may include machine code. That is, the code module may include code that is directly interpreted by computer hardware. An example of such a code module is a binary module. The code module may share state, that is, computer memory, with other programs or code modules of a computer system. It is the references to this shared state that may be verified through the method 150.

After the references to shared state are identified, a static verification of operations associated with the shared state may be performed at step 160. Step 160 may be performed, for example, to verify assignment of values to the shared state. That is, the verification method 150 may include checking the assignment of values known prior to execution.

For other operations performed during execution of the code module that are associated with, for example, assignments or values that may be indeterminate prior to execution, step 165 may verify that in-line guards within the code-module are prepared to ensure that the other operations will be executed properly. For example, the verification at step 165 may ensure that guards will check values prior to assignment of the values to ensure that the values are proper. The guards may check the address of an assignment to ensure that the address, unknown prior to execution, is proper. The guards may ensure that an assignment will actually be executed during execution of the code module. The guards may include, for example, control-flow integrity guards, and therefore, the verification at step 165 may ensure that the guards will properly monitor control flow. Alternatively, for example, such guards may include a check of a first address of shared state at execution as well as a check of a range of addresses contiguous to the first address to ensure that other indeterminate data may be written to this contiguous range during later execution. Other such in-line guards are also envisioned.

Figure 3:
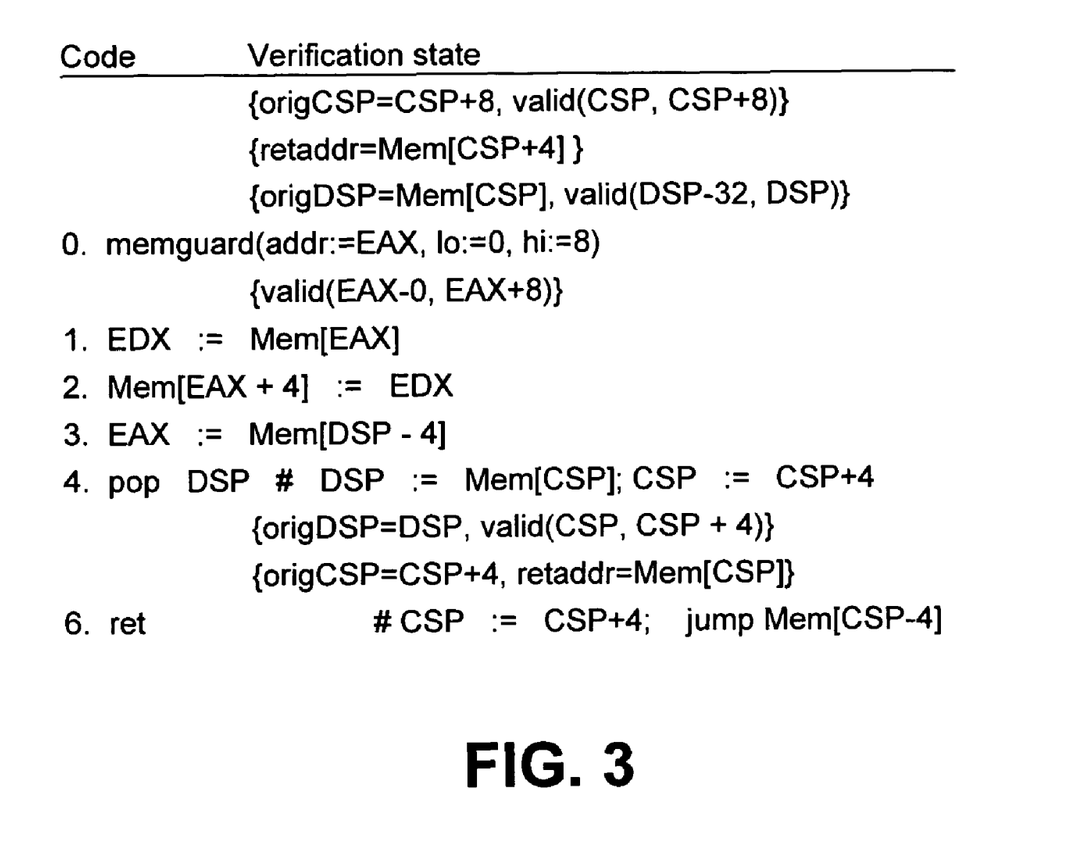
FIG. 3 provides an example code fragment used by the verifier.

FIG. 3 provides an example code fragment that may be used by the verifier 140. The items written in braces correspond to verification state at the given program point. A memory range guard in line 0 may verify that the memory in the range EAX−0 and EAX+8 lies within a single accessible memory area. The program may access the word stored at address EAX to address EAX+4, load the return value from the data stack into EAX (in line 3), restore the data stack pointer (DSP) by loading it from a virtual register on the control stack, and then return. As shown in the comments, the return may also use the control stack.

Verification may proceed by considering the execution of machine language instructions on abstract program states that encode known facts about the state of the execution. For each instruction, the verifier may ensure that the abstract state guarantees safe execution of the instruction, and may compute the abstract state for the successor instruction. These abstract states may be viewed as (limited) predicates describing concrete execution states, and abstract execution of an instruction can be expressed as a Hoare triple: {start state} instruction {end state}. FIG. 3 shows a fragment of the verification state for an example program. On entry to this program fragment, the verifier may "know" that the original value of the code stack pointer is 8 more than the current value, the return address is in the virtual register at address CSP+4 (control stack pointer+4), and the value on function entry of the data stack pointer is stored in the virtual register at address CSP. Finally, the addresses between DSP-32 and DSP are known to fall into a contiguous accessible memory region.

The verification state may keep track of the contents of the virtual registers (the control stack frame). This is possible because the verifier 140 may enforce a requirement that all accesses to those memory locations can be statically detected as using known constant offsets from the control stack pointer.

The verifier 140 may recognize the meaning of the instructions that make up the memory range guard in line 0, and may add the corresponding fact to the verification state for the following instruction. All of the previously known facts are preserved in this case. For clarity, FIG. 3 shows only modifications to the verification state. All the memory accesses in this program may be checked using the valid facts. The arithmetic operation implicit in the pop instruction on line 4 may be reflected in the verification state by replacing CSP with CSP-4. Note also that incrementing the CSP may effectively shrink the memory range accessible through CSP. This may help ensure that the code does not rely on the contents of the stack below CSP, as it can be set to arbitrary values at any time, upon an asynchronous interrupt. In line 6, the verifier 140 may recognize a function return, and it may check that the stack pointers have been restored to their original values and the proper return address is used. To enable this reasoning, the verifier 140 may include support for manipulating linear equalities and inequalities.

To simplify the process of verification, the module (i.e., a protected binary) may include a set of verification hints that guide the verifier 140. For the simplest version of the verifier 140, the hints may provide the verification state for the entry to each basic block. A basic block is a sequence of machine code operations that execute in sequence without any control flow.

The verification may be done one basic block at a time, and on basic block exit, the verifier 140 may check that the accumulated verification state implies the provided state for the successor blocks.

As described herein, the verifier 140 may also ensure that the proper control-flow-integrity guards are used at computed control transfers. First, the verifier 140 may expect hints to specify the set of possible targets of computed jumps, which in turn may allow the verifier 140 to collect the set of control-flow-integrity target identifiers used in the module. The verifier 140 may also scan the machine code of the module to ensure that the only occurrences of the identifiers are at the beginning of basic blocks. Finally, the verifier 140 may allow computed control flow only when the verification state records the fact that an appropriate control-flow-integrity guard has been performed.

The structure that allows a module to pass verification can be established by hand, by compilation from legacy source code, or by automatic transformation of existing machine-code binaries. It should be understood that verification of a code module may be completed, for example, by users of extensible systems to establish the module's safety before it is installed or executed. Verification may be useful in other scenarios as well. For instance, for systems structured as distinct modules with clearly defined interactions, verification may be a quality assurance step during software production.

The verifier 140 may prevent execution of dangerous, privileged instructions (such as, for example, the IRET). As the verifier 140 statically evaluates a code module, it may ensure that, for example, there are no instances prohibited operations.

The verifier 140 additionally may also access a counter placed in memory that may be inaccessible to a program. The counter may enable a special runtime guard to count how many instructions the program has executed. For example the counter may increment for all instructions included in a basic block. Such incrementing may also be completed simultaneously for basic blocks executing simultaneously. When the counter reaches a certain value, an exception may be generated to halt program execution. Thus, the special runtime guard may time-limit or instruction-limit program execution.

Figure 4:
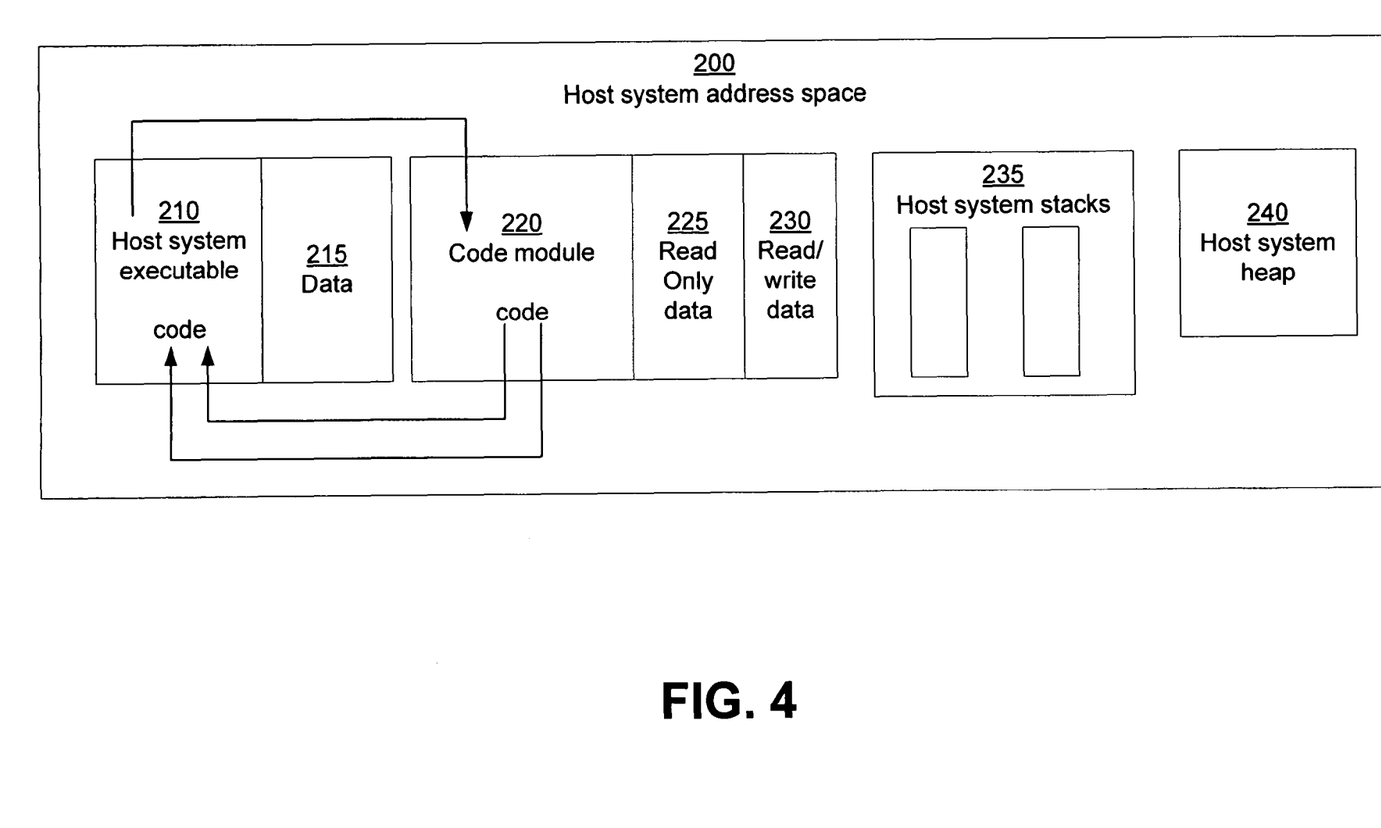
FIG. 4 is a depiction of an example address space of a host system that uses a code module according to one embodiment.

FIG. 4 is a depiction of an example address space of a host system 200 that uses a code module 220 according to one embodiment. The address space 200 may include host system executable code 210, host system data 215, a code module 220, read-only data 225, read and write data 230, host system stacks 235, and a host system heap 240. The external interfaces of the code module 220 may be restricted, as shown by the arrows. When the code module 220 uses a host system stack 235, it may be as a control stack of virtual registers, as described more fully herein. The read and write data 230 may be the only areas that are subject to arbitrary writes by the code module 220. In alternative embodiments, the code module 220 may include only read-only memory.

Protections described herein may benefit any host system that loads binary modules such as the code module 220 into its address space to make use of their functionality. Operating systems are example host systems, as are web browsers. Conversely, those modules may rely on their host system, by invoking support routines. For example, the code module 220 in FIG. 4 can use two support routines, and can be called through a single entry point by its host system. The module can read its code and constants (or, optionally, all of memory). It may write to a section of its loaded module binary 230, and to contiguous heap regions 240 to which the host system has granted it write access.

The code modules 220 protected in the manner described herein may be normal executable binaries (e.g., DLLs), and can be loaded and used as such. As a result, host systems may be unaware whether or not they are using such a protected code module 220. For multi-threaded systems, or those with complex access to memory, protection according to alternative embodiments does rely on some support components—in particular for thread-specific management and for the granting and revocation of memory access permissions.

The codes module 220 may be a dynamically-loadable executable in a host-system appropriate object format. In one implementation, the code module 220 is one of a Microsoft Windows "Portable Executable" binaries, often named EXEs or DLLs, for example.

The code module 220 may consist of multiple sections, each of which may have different access permissions. Machine code may be in one executable section, and program data, such as read-only constants and writable global variables, may be in others. Data in import and export sections allow the determination of module 220 entry points, and use of host-system support routines. Other sections, and a module header, may provide host systems with auxiliary data, e.g., for load-time relocation of the binary module 220, versioning, cryptographic signatures, etc. Once a module is loaded, auxiliary sections may be discarded from memory.

Protection in alternative embodiments may rely on several module sections. Import sections, as well as host-system policy, may limit a code module's 220 use of support routines; similarly, memory access may be constrained by section-access permissions. A relocation section may be used to give proper values to module constants, such as the constants A+L used in memory-range guards, described further herein. Finally, an auxiliary section may be used to hold untrusted verification hints, also described further herein.

Code modules 220 can help establish efficient memory protection. For example, writable fastpath memory, as described further herein, may lie completely within the read/write section 230 of the code module 220. Once loaded, the code module 220 can have any amount of this memory (a section-header value gives its size). In this embodiment, the code module 220, or its host system 200, may provide a heap implementation that allocates memory within that region. A large fastpath region may not be a waste of physical memory. That is, host systems 200 with virtual memory support can allocate physical pages as requested by the code module 220 (e.g., by a call to a support routine). This strategy may be attractive for 64-bit systems, where ample virtual size can be given to fastpath memory.

Figure 5A:
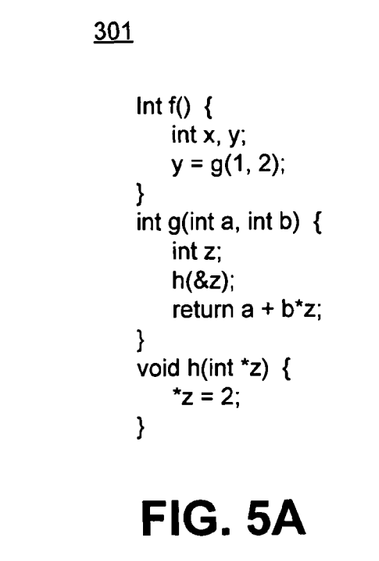
FIGS. 5A, 5B, and 5C are, respectively, an example source code excerpt, a typical stack that may be associated with the source code excerpt, and a data stack and a control stack that each may be associated with the source code excerpt.
Figure 5B:
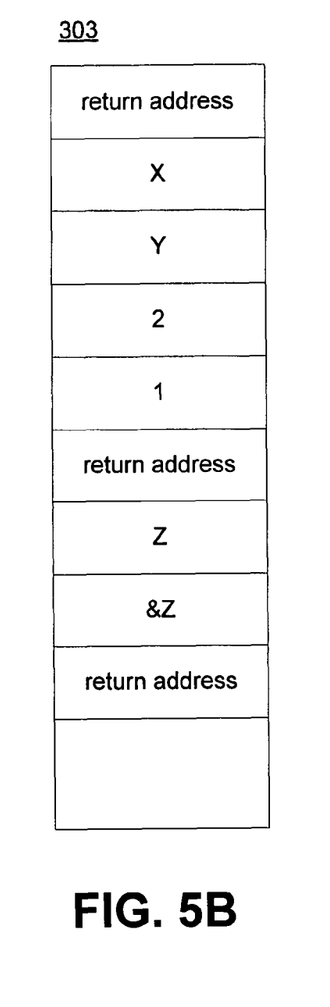
Figure 5C:
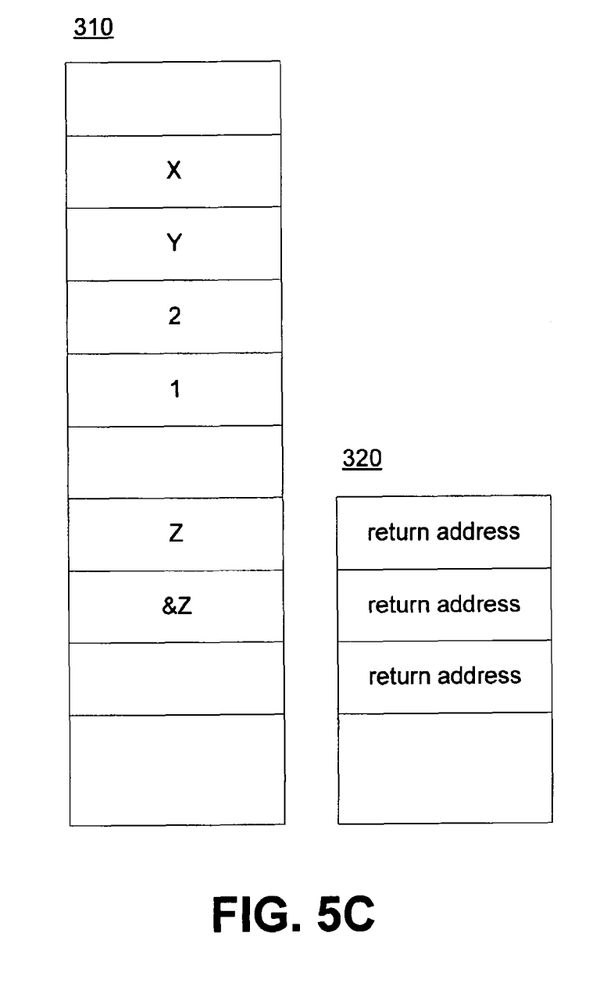

FIGS. 5A, 5B, and 5C are, respectively, an example source code excerpt 301, a typical stack 303 that may be associated with the source code excerpt 301, and a data stack 310 and a control stack 320 that each may be associated with the source code excerpt 301. The source code excerpt 301 is provided to show how the typical data stack 303 may be generated during execution in comparison to how data stacks 310, 320 may be generated during execution. The stacks 310, 320, combined, may include all of the information of the data stack 303. However, the control information (e.g., the return address) may be separated to a distinct control stack 320 from the local variables X, Y, Z, and the arguments 1, 2, & Z stored in the data stack 310. Alternatively, the data stack 310 may include only Z, with the control stack 320 including all other data.

While the verifier 140 may perform a static check of a code module 220, which may include the source code excerpt 301, alternative embodiments may include runtime protection mechanisms as well. Broadly, a stack may include two types of information. First, a stack may include a summary of execution of a program so far. Second, a stack may include prescriptive information related to what may happen in the future. An embodiment incorporates a recognition of these two types of information and the related functions of a stack.

Stack data that may be shared within a code module, and that therefore may be corrupted during execution, may placed on a data stack 310. The data stack 310 thus may not be critical for safety but may instead keep track of certain intermediate program state. The data stack 310 may therefore include a summary of execution of a program so far.

Other stack data, including function-return addresses, may remain on the regular execution stack, which may be referred to as the control stack 320. In the code module 300, the control stack 320 may be prevented from being accessed via computed memory references, such as pointers, and may therefore be used to provide virtual registers: incorruptible thread-local storage for code module state. In one embodiment, the control stack 320 may include a stack register that points to at least a fixed amount of writable stack memory. Additionally, the stack may accurately reflect function calls, returns, and exceptions, to that point. Thus, the control stack 320 include prescriptive information related to what may happen in the future.

Thus by including distinct data and control stacks 310, 320, embodiments provide safety in relation to memory accesses. For example, for a computed write, safety may depend not only on the address but also on the value being written. For safety, the write may be prevented from corrupting memory that holds values whose integrity must be maintained, such as return addresses stored on the control stack 320. Therefore, the control stack 320 may be used in a stylized, structured manner, and may not be the subject of a computed memory access. A separate data stack 310 may be used for those stack values that a code module may access via a pointer. These may include all stack values whose address is taken (e.g., local arrays, or local variables passed as call-by-reference arguments to functions).

Explicit references to the control stack 320 may be to, for example, CSP+K, where K is a positive, properly aligned constant, and CSP is the control-stack pointer register. In one embodiment, implementation of CSP is an x86 stack register ESP, so that pushes, pops, calls, and returns use the control stack 320. Furthermore, at each instruction of a module function, the control stack 320 may be of a known, constant depth. Finally, within each function, CSP can be lowered and raised by constant amounts, in a controlled fashion.

The memory of control stacks 320 may not be accessible to a code module 220, except in the manner described herein. Therefore, locations on the control stack 320 can function as virtual registers, that is, like registers, they are thread-local state that may be accessed by name.

On the other hand, thread-local module data that is subject to computed memory access may be stored on the data stack 310, indexed by a data stack pointer (DSP) register. In one embodiment, an x86 register EBP may be used to hold DSP. Within each function, DSP can be modified only in a controlled fashion, by either a constant amount or one bounded by a guard. DSP may be preserved by a function call.

Usually, both the control and data stacks 310, 320 may be accessed through hardware registers CSP and DSP. However, sometimes an additional base pointer may be used, for instance, for variable-size allocation of data-stack memory of the kind done by alloca in C. In these cases, more registers, some of them virtual, may act as stack pointers. Guards may be used be placed at each module entry point, as well as in any cycle in the module's function-call graph.

When the verifier 140 inspects a program or module, the verifier 140 may ensure that the program uses the stacks 310, 320 properly. If a program does not use the control stack 320 properly, program execution may be halted. Thus the verifier 140 may establish that, when a function is called and when there is a return from a function, the call and return operations incorporate a stack pointer pointing to the control stack 320. In one embodiment, the verifier 140 may ensure that no other operation modifies a value in the control stack register. Similarly, there may be a data stack register, and accesses to local variables and arguments of a function may be made through that data stack register. In further alternative embodiments, a data stack register may only be changed in a controlled fashion. For example, the data stack register may be changed to reflect all of the local variables of a function before that function calls another function. In one embodiment, this can be implemented by having the calling function or caller subtract from the data stack pointer the space consumed by the caller function or the calling function local variables and the argument that it is about to pass on to the callee. Immediately after the called function (the destination) has returned, the same value subtracted earlier may be added back.

Further the control stack 320, in one embodiment, may only be modified by call and return operations. In another embodiment, the control stack 320 may be modified by pushes and pops of register values as long as those pushes and pops are appropriately nested in the control flow so that there is a matching pop for every push as the program executes. The verifier 140 would need to establish that. This might mean that, dynamically at runtime, all pushes will have to be matched to pops before the call of any function, before the end of any function, or before the end of a basic block.

Thus, an embodiment includes a two-stack model of execution. In general, host systems may support this model, in particular by allocating and managing the data stack 310 and by copying arguments and results between stacks 310, 320. In an alternative embodiment, no data stack may be needed for certain simple code modules, such as, for example, code that does not use stack arrays and does not take the address of stack memory. A host system that loads only such modules may omit all support for data stacks.

In alternative embodiments, discontiguous threaded stacks may be maintained via stack validity checks. When a code module is executed, memory may be preallocated for the execution. If the size of this preallocated memory is not large enough, more memory discontiguous with the preallocated memory may be dynamically allocated during the execution. The verifier 140 may need to check to ensure the structure of discontiguous stacks is maintained. For example, the verifier 140 may establish that, on any modification to the stack pointer, in particular a call to a function higher up in the function, the structure is maintained.

Additionally, guarantees may be implemented, for example, on the ESP register for x86 ring-0 avoidance of double faults. The verifier 140 may ensure that the control stack pointer register includes a valid address with at least three spaces for writing. The x86 flags register may be safely saved on the control stack. Only condition codes may be changed and code may "pushed" and "popped" in safe ways.

In addition to using a incorruptible control stack distinct from a data stack, another runtime memory protection mechanism involves optimized checking of multiple memory accesses by a single memory guard. This single memory guard may promote fast access to the most frequently used memory. This may help reduce the number of checks required by ensuring multiple instructions have been checked within this bounded "padding" area on either side of an address.

In alternative embodiments, protections may be included to maintain a structural property or a structure of the control stack 320. Thus, protections may be included to prevent any over-writing. For example, the control stack 320 may be required to be structured in a particular sequence. The verifier 140 may check to ensure that the stack 320 maintains its required structure by evaluating the sequence. Thus, the control stack 320 may be protected such that its data is incorruptible and its structure is correct.

One aspect of the structure of the control stack 320, for example, that may be important to maintain is the exception frames. It may be important to maintain a first-in-last-out sequencing of the frames. The exception frames may contain pointers to each other, and thereby, exception frames may be linked to previous exception frames. The verifier 140 thus may help maintain the integrity of the "nestedness" property of the control stack 320. The verifier 140 also may ensure that only the exception frame creation code can modify links that precede a frame.

Whether using separate data and control stacks 310, 320, a code module may be able to access memory that contains its code, read-only constants, and writable global variables, in order to execute, read, and read or write that memory, respectively. In addition, a host system may wish to give selective access to other memory regions. In alternative embodiments, guards for enabling the use of those additional regions, in any number, and of any granularity and type of access, may be used.

A code module 220 may have access only to a certain set of contiguous memory regions; for each type of access, a certain range, such as two bounds established by a loader such as, for example, A to B, may be special, as explained herein. For constant addresses, and the control stack 320, this property may be established by static verification by the verifier 140. A guard may be used for other accesses.

Memory-range guards may help ensure that a register holds an accessible address; they also ensure that a range around this address is also accessible (within constant offsets L (low), below, and H (high), above). Control-flow integrity may imply that a single such guard can protect multiple memory accesses—namely, those that it dominates, use the same register value, and remain within the constant range bounded by L and H. Similar (but more complex) memory-range checks may ensure that only accessible addresses are used in simple loops such as the x86 REP instructions, for example. In this case, L or H may be variable, but are bounded by the guard.

Figure 6A:
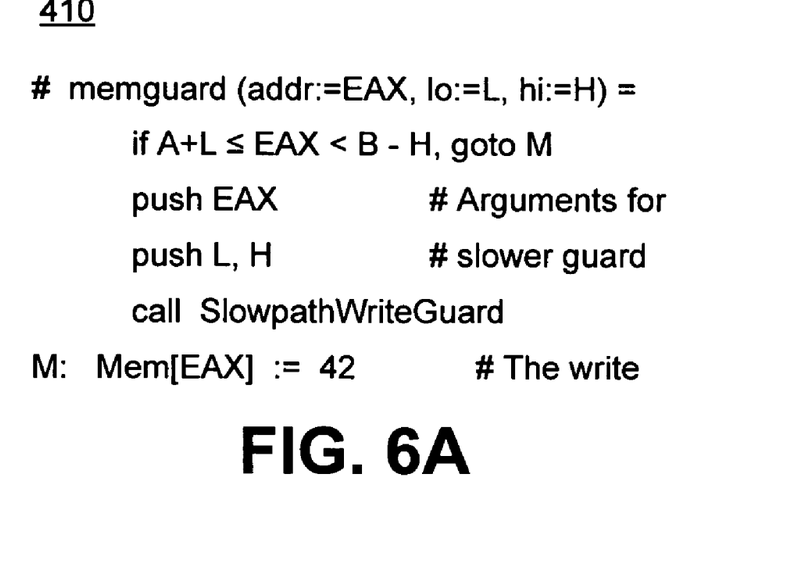
FIG. 6A shows an example memory-range guard for a write to memory pointed to by EAX.
Figure 6B:
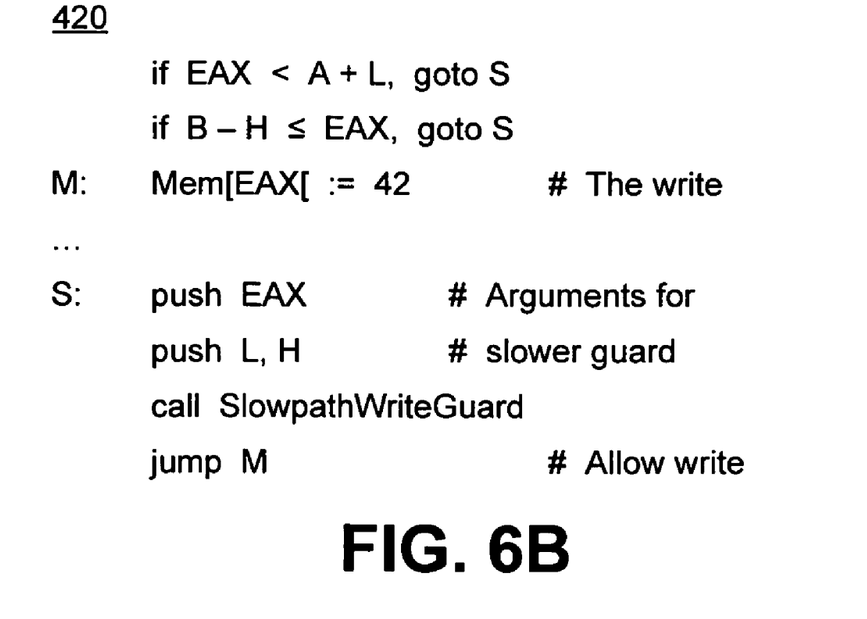
FIG. 6B shows an example memory-range guard for a write consistent with the x86 computer architecture.

FIG. 6A shows an example memory-range guard 410 for a write of 42 to memory pointed to by EAX. FIG. 6B shows an example memory-range guard for the x86, for a write. The memory guard 410 establishes that all addresses between EAX−L and EAX+H can be written. Memory-range guards may be implemented as two paths: one faster, the other slower. The fastpath may directly compare an address in a register with constants for A+L and B−H, embedded in the guard code. In an x86 implementation, for example, these constant bounds may be derived from the load address of the code module. If the address lies between these constants, then the guard may permit access. The fastpath check shown in FIG. 6B may be correct even for machine arithmetic if the constants L and H are positive and smaller than the size of the range A−B.

Thus one embodiment may make use of a fastpath region with endpoints A and B. Those endpoints may be embedded as constants, in the memory-range guards and may be set during loading. Typically, fastpath memory is a region of the code module, and endpoints may be relocation constants, which may be set automatically during loading. However, the fastpath endpoints could be any region, or even held in reserved registers.

If the fastpath comparisons fail, then the guard may call a host-system slowpath search with appropriate arguments. The slowpath may search to see if the address range lies within any other accessible memory regions. The address, and the values L and H, are parameters to this search. The search itself may be arbitrary code, and may, for example, involve direct comparisons or data structures similar to page tables. The search may be invoked by a direct jump, a trap or fault (e.g., the x86 bounds exception), or by other explicit or implicit control flow.

For example, for an x86 processor, the memory-range guard 420 may call a slowpath function. However, as shown in FIG. 6B, this call is not placed inline because this may waste code cache and also because forward branches may be predicted as not taken, by default. In one embodiment, guards may raise exceptions, caught by a slowpath guard provided by the host system paths. Alternatively, the use of an x86 BOUND instruction may be avoided, both because it is significantly slower than the example guard 420, but also because, for example, in the Windows kernel bounds exceptions are treated as fatal conditions.

In addition to providing optimized checking of multiple memory accesses by a single memory guard, another optimization may be to include the data stack 310 in slowpath memory. One of the pieces of memory that may have to be added dynamically to a program is the set of threads that are currently executing in the program because the set of threads using a program may be unbounded. Therefore, when the program is executed, slowpath memory may be created and the data stack may be placed in that memory.

Thus, there may be one range bounded by a special A and a special B, and the memory-range guard may check only whether X plus/minus the padding is within that special range. This may be placed in the code itself. If that check for some dangerous operation fails, then a check of all other A's and B's may be completed. In fact, that first AB range might be part of the program itself because programs and packages, like executable files or DLLs include both code and data.

Additionally, in the slowpath, memory-range guards may search permission tables, e.g., runtime data structures, maintained by the host system, that hold the set of accessible memory regions. There may be multiple such tables, one for each type of slowpath access. Each search may check whether a range R−L to R+H lies within a contiguous memory region to which the host system has granted access.

Searching these tables may be fast, as some software will access memory in a manner that frequently calls the slowpath of memory-range guards. Fortunately, fast permission tables can be implemented in several ways. In particular, by making permission tables similar to page tables, searches can use known, efficient techniques for software-filled translation look-aside buffers.

In one embodiment, permission tables are very simple: a null-terminated list of address pairs, of the start and end of regions. Searches of this data structure can be lockfree (at least on the x86), as long as updates are done carefully, e.g., if an entry is revoked by setting its pair as (−1, 0) in two successive, ordered 32-bit writes. Even though there may be faster alternatives, this embodiment may maintain, and search.

A host system may associate a data stack with each thread that executes in a code module. There are several considerations in such data stack management, both in terms of performance and resource consumption. For instance, a thread can keep using the same data stack if it uses a code module reentrantly (i.e., if support routines call module entry points); alternatively, it may adopt a new data stack on each entry.

Therefore, in one embodiment, a pool may be used from which host-system threads draw data stacks when they call code modules. Data stacks in the pool may be allocated in slowpath memory; the size of the pool may be adjusted based on the concurrency in the code module. The pool's data structure may be a simple array, guarded by a single lock; it may be consulted to acquire and release data stacks, as threads go through software call gates.

It should be recognized that embodiments described herein may not require hardware implementation. However, in alternative embodiments, hardware may be implemented to increase simplicity, precision, or efficiency of integrity enforcement. For example, hardware instructions may be included that compactly and efficiently encode control-flow integrity checks. This may be accomplished by including a label instruction for control-flow-integrity labels. The labels may be used for computed jumps or function pointer calls. The labels are instructions that encodes IDs in a certain way.

Control-flow-integrity guards may be implemented, for example, with instructions such as a cfilabel instruction. The cfilabel instruction may contain a 16 bit, immediate identifier. The cfilabel may be the destination of checked branch instructions. It may contain a 16-bit, immediate label value. The effect of the instruction may be to compare the immediate with the content of the control-flow-integrity register, and to reset the register if the two are equal. This particular choice of semantics for the cfilabel may allow multiple cfilabel instructions with different immediates to be used in sequence to implement "join" points in a control flow graph. Such a join point may be the target of multiple branches with different labels. This may allow building more precise control flow graphs.

Additionally, a control-flow-integrity variant of computer transfer functions may be implemented, such as "indirect jump", "return", and "jump to subroutine" instructions. The control-flow-integrity transfer instructions may contain an immediate identifier (instead of hint bits). After a control-flow-integrity transfer instruction with identifier ID, a cfilabel with ID may be executed before any other type of instruction; otherwise, a hardware exception may be triggered. Between these instructions, the value ID may be stored in a distinguished CFI register (which may be a normal, renamed register, so multiple control-flow-integrity guards can simultaneously be in flight). The control-flow-integrity register need not be read on each instruction. For example, it can be safely ignored when zero. Additionally, this may be monitored with a two-state automaton in the commit stage of the pipeline.

An alternative hardware implementation may facilitate the memory-range guard. A register X and immediate constants for L and H may be used to establish that the memory range check is true for those three values and a set of implicit hardware registers for A and B. Thus the values for A and B may be either explicit or implicit. That is, the values for A and B could be passed in as explicit arguments. If the formula does not evaluate correctly, instead of failing or halting the execution of the program, it may behave as it would for a call instruction. That is, it may call a special function, passing in as argument at least three values, X, H, L. That function may take X, H, L run through all other As and Bs to determine if the expression holds true for any of them. Thus, memory-range guards may be implemented as three new instructions, one for each type of access (read, write, or execute). These instructions may take the form mem-guard R, L, H, naming a register R, and providing L and H as, for example, 10 bit immediate constants. Each instruction may ensure that a range R−L to R+H lies within a region A to B; when this is not the case, an exceptional, slowpath code is invoked.

In alternative embodiments, designs for software machine-code sequences may be implemented legacy hardware (such as, for example, x86) for optimization. For example, to optimize control-flow integrity, the identifying bit pattern may be placed before the function, not within the function. A check may then be performed by evaluating a location immediately preceding, for example, a computed jump destination. For example, if a destination is X, a check may be performed at X−3 to evaluate the associated identifying bit pattern.

Another way of optimizing control-flow-integrity checks may involve C++ virtual functions. In embodiments implementing separate data and control stacks 310, 320, fewer checks may be necessary because most control-flow-integrity checks result from return instructions. Because return instructions use the control stack 320, which may be incorruptible, checks need not be performed. Checks may be necessary when calling function pointers. A large source of function pointer use is the C++ virtual function. One optimization for checks in the presence of C++ virtual functions is to not actually check identifier bits on a call to a virtual function, but rather check whether its v-table (an immutable table of function pointers) lies within a certain range. The v-table pointers may be located in regions that are contiguous sequence of v-tables, which may be read-only. If the v-table lies in the range, then there is a valid function pointer being called.

Example Computing Environment

Figure 7:
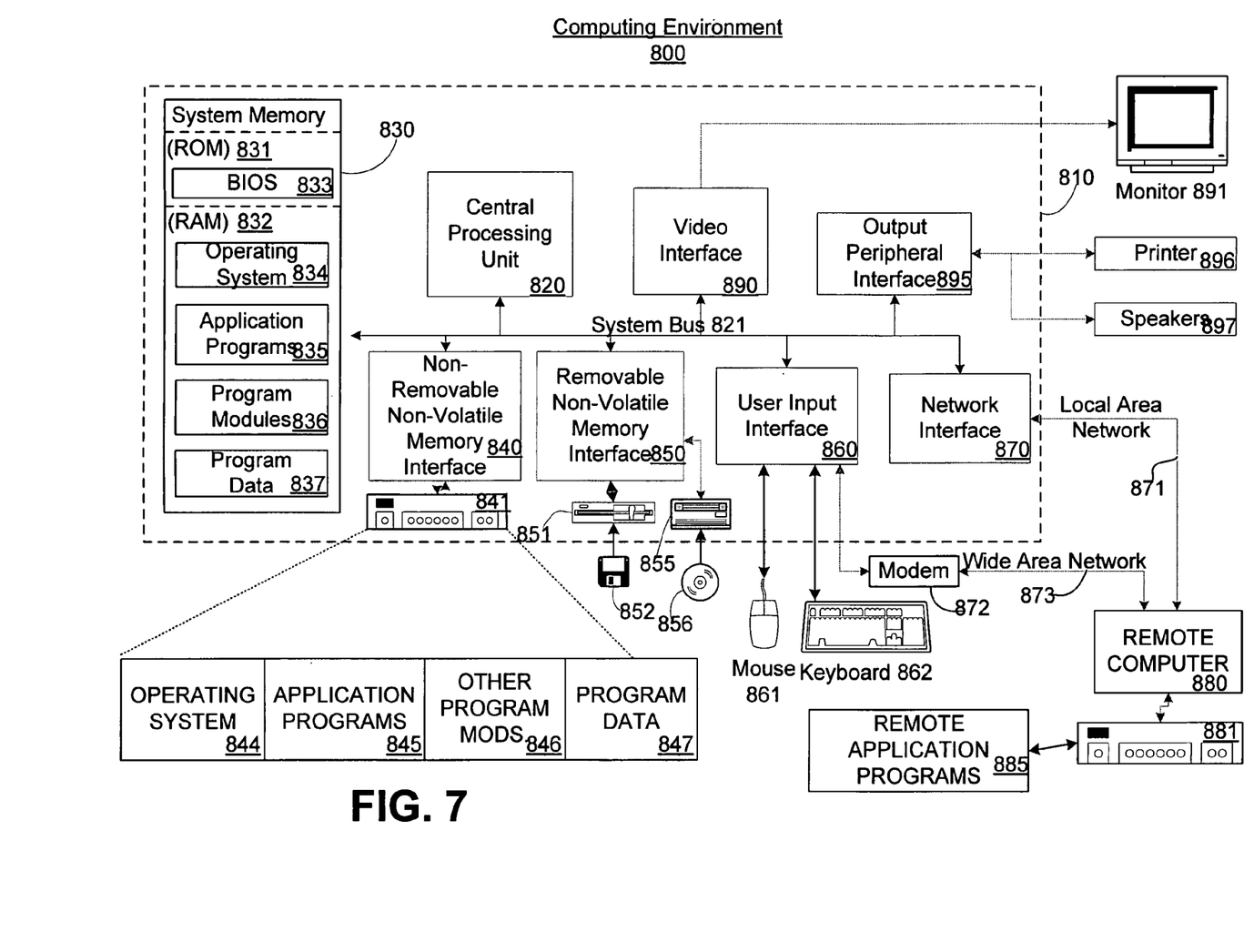
FIG. 7 is a block diagram showing an example computing environment in which embodiments may be implemented.

FIG. 7 and the following discussion are intended to provide a brief general description of a suitable computing environment 800 in which an example embodiment may be implemented. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The term "data" refers to any information of any form, including commands, transfers, notifications, or requests. The terms "program code" and "code" refer to any set of instructions that are executed or otherwise processed by a processor. A processor may include a runtime or virtual machine such as the Java virtual machine, for example.

While a general purpose computer is described below, this is merely one example. The present invention also may be operable on a thin client having network server interoperability and interaction. Thus, an example embodiment may be implemented in an environment of networked hosted services in which very little or minimal client resources are implicated, e.g., a networked environment in which the client device serves merely as a browser or interface to the World Wide Web.

Although not required, embodiments can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. An embodiment may also be practiced in distributed computing environments where tasks are performed by remote processing devices that are linked through a communications network or other data transmission medium. In a distributed computing environment, program modules may be located in both local and remote computer storage media including memory storage devices.

FIG. 7 illustrates an example of a suitable computing system environment 800 in which an embodiment may be implemented, although as made clear above, the computing system environment 800 is only one example of a suitable computing environment and is not intended to suggest any limitation as to the scope of use or functionality alternative embodiments. Nor should the computing environment 800 be interpreted as having any dependency or requirement relating to any one or combination of components illustrated in the exemplary operating environment 800.

With reference to FIG. 7, an example system for implementing an embodiment includes a general purpose computing device in the form of a computer 810. Components of computer 810 may include, but are not limited to, a central processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 810 typically includes a variety of computer readable media. Computer readable media can be any available media that can be accessed by computer 810 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

The system memory 830 includes computer storage media in the form of volatile and/or nonvolatile memory such as ROM 831 and RAM 832. A basic input/output system 833 (BIOS) containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837. RAM 832 may contain other data and/or program modules.

The computer 810 may also include other removable/non-removable, volatile/nonvolatile computer storage media. By way of example only, FIG. 7 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 7 provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB).

A monitor 891 or other type of display device is also connected to the system bus 821 via an interface, such as a video interface 890. In addition to monitor 891, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 7. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on memory device 881. It will be appreciated that the network connections shown are exemplary and other means of establishing a communications link between the computers may be used.

A computer 810 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

The methods of the present invention may be implemented in hardware, software or, where appropriate, a combination of both. Thus, the methods and apparatus of the present invention, or certain aspects or portions thereof, may take the form of program code (i.e., instructions) embodied in computer readable medium. A processor that executes program code for performing the steps of the methods of embodiments, as described in FIGS. 1-6B and as claimed, constitute a computing environment that embodies the present invention. In the case of program code execution on programmable computers, the computing environment will generally include a processor, a storage medium readable by the processor (including volatile and non-volatile memory and/or storage elements), at least one input device, and at least one output device. One or more programs are preferably implemented in a high level procedural or object oriented programming language to communicate with a computing environment. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed:

1. A computer-implemented method of controlling shared state that is shared between a first code module and a second code module at execution of the first code module, the computer-implemented method comprising:
   before execution of the first code module, using a computer to perform a static verification of a first operation associated with the shared state to ensure that the first operation associated with the shared state will be executed properly; and
   using a computer to perform a static verification of a guard to ensure that the guard will ensure that a second operation associated with the shared state will be executed properly.

2. The computer-implemented method of claim 1, further comprising the step of:
   identifying, in the first code module, a first reference to the shared state, wherein ensuring that the first operation will be executed properly comprises ensuring that a first assignment to the shared state will result in assigning a proper value to the shared state when the first code module is executed, wherein the first assignment is associated with the first reference.

3. The computer-implemented method of claim 1, further comprising the step of:
   identifying, in the first code module, a second reference to the shared state, wherein ensuring that the guard will ensure that the second operation is executed properly comprises ensuring that the guard will ensure that a second assignment to the shared state will result in assigning a proper value to the shared state when the first code module is executed, wherein the second assignment is associated with the second reference.

4. The computer-implemented method of claim 1, wherein ensuring that the first operation will be executed properly is adapted to be performed during creation of the first code module.

5. The computer-implemented method of claim 1, wherein ensuring that the first operation will be executed properly is adapted to be performed by a computer, wherein the computer is used by an end-user of the first code module.

6. The computer-implemented method of claim 1, wherein the shared state comprises a hardware register.

7. The computer-implemented method of claim 6, wherein the register is at least one of an instruction pointer, a stack pointer, a flags register, a processor control register, and an implicitly referenced register.

8. The computer-implemented method of claim 1, wherein the shared state comprises at least one of a control stack, a thread control memory, a process control memory, and control memory for handling of exceptions or signals.

9. The computer-implemented method of claim 1, wherein the first code module comprises instructions that are capable of being directly interpreted by computer hardware.

10. The computer-implemented method of claim 1, wherein the first code module comprises a data stack within its exclusive state, wherein the data stack is subject to computed memory accesses.

11. The computer-implemented method of claim 1, wherein the guard comprises code for enforcing control flow integrity of the first code module.

12. The computer-implemented method of claim 1, wherein the guard comprises code for,
   determining a location of a first address,
   evaluating the first address to determine if first data can be safely written to the first address,
   evaluating a range of addresses, the range of addresses comprising the first address and a plurality of addresses bounded by a lower address and an upper address, and
   determining if second data can be safely written to each address of the range of addresses.

13. The computer-implemented method of claim 1, wherein the computer-implemented method is adapted to be performed by at least one of a compiler, a rewriter, a run-time code generator, and a verifier.

14. A computer-readable storage medium, wherein the computer-readable storage medium is not a signal, having computer-executable instructions for performing steps comprising:
   performing a static verification of a first operation associated with a shared state to ensure that the first operation associated with the shared state will be executed properly;
   performing a static verification of a guard to ensure that the guard will ensure that a second operation associated with the shared state will be executed properly, wherein the shared state is shared between the first code module and a second code module at execution of the first code module, and wherein the first code module comprises instructions that are capable of being directly interpreted by computer hardware:
   providing a data stack for storing stack data that can be shared within one of the first code module and the second code module; and
   providing a control stack for storing stack data that is not stored by the data stack, the control stack being inaccessible using a computed memory reference.

15. The computer-readable storage medium of claim 14, having further computer-executable instructions for performing the step of:
   identifying, in the first code module, a first reference to the shared state, wherein ensuring that the first operation will be executed properly comprises ensuring that a first assignment to the shared state will result in assigning a proper value to the shared state when the first code module is executed, wherein the first assignment is associated with the first reference.

16. The computer-readable storage medium of claim 14, having further computer-executable instructions for performing the step of:
   identifying, in the first code module, a second reference to the shared state, wherein ensuring that the guard will ensure that the second operation is executed properly comprises ensuring that the guard will ensure that a second assignment to the shared state will result in assigning a proper value to the shared state when the first code module is executed, wherein the second assignment is associated with the second reference.

17. The computer-readable storage medium of claim 16, having further computer-executable instructions for performing the step of:

limiting at least one of the amount of time and the number of steps during which the shared state is assigned the value.

18. The computer-readable storage medium of claim 17, wherein the shared state comprises an instruction register adapted to limit the time that a program is executing in the second module.

19. The computer-readable storage medium of claim 17, wherein the shared state comprises a control register adapted to limit an amount of time during which interrupts are disabled.

20. A computer-readable storage medium having computer-executable instructions for performing steps comprising:

performing a static verification of a first guard in a first code module to ensure that the first guard in the first code module will enforce control flow integrity of the first code module when executed; and performing a static verification of a second guard in the first code module to ensure that the second guard in the first code module will, at execution, evaluate a first address to determine if first data can be safely written to the first address, evaluate a range of addresses, the range of addresses comprising the first address and a plurality of addresses bounded by a lower address and an upper address, and determine if second data can be safely written to each address of the range of addresses, wherein the first code module comprises instructions that are capable of being directly interpreted by computer hardware, wherein the computer-readable storage medium is not a signal.

* * * * *

UNITED STATES PATENT AND TRADEMARK OFFICE
CERTIFICATE OF CORRECTION

| | | |
|---|---|---|
| PATENT NO. | : 8,104,021 B2 | Page 1 of 1 |
| APPLICATION NO. | : 11/450493 | |
| DATED | : January 24, 2012 | |
| INVENTOR(S) | : Ulfar Erlingsson et al. | |

It is certified that error appears in the above-identified patent and that said Letters Patent is hereby corrected as shown below:

In column 18, line 44, in Claim 14, delete "hardware:" and insert -- hardware; --, therefor.

Signed and Sealed this
Thirteenth Day of March, 2012

David J. Kappos
*Director of the United States Patent and Trademark Office*